United States Patent
Hecht et al.

(10) Patent No.: US 6,418,591 B1
(45) Date of Patent: Jul. 16, 2002

(54) TIGHTENING STRIP WITH TENSION LOCKING SYSTEM

(75) Inventors: Reinhard Hecht; Karl Manstorfer, both of Maximilianstrasse 14, D-93047 Regensburg (DE); Peter Lehmann; Heinz Maag, both of Niederwangen (CH); Hans Wyder, Monchaltorf (CH); Hans Bunschi; Marco Weingarten, both of Zurich (CH)

(73) Assignees: KA-TE System AG, Zurich (CH); Reinhard Hecht; Karl Manstorfer, both of Regensburg (DE)

( * ) Notice: Subject to any disclaimer, the term of this patent is extended or adjusted under 35 U.S.C. 154(b) by 0 days.

(21) Appl. No.: 09/601,284
(22) PCT Filed: Aug. 7, 1998
(86) PCT No.: PCT/CH98/00331
§ 371 (c)(1), (2), (4) Date: Oct. 31, 2000
(87) PCT Pub. No.: WO99/42865
PCT Pub. Date: Aug. 26, 1999

(30) Foreign Application Priority Data

Feb. 17, 1998 (EP) .................................................. 98102682

(51) Int. Cl.$^7$ .......................... B65D 63/00; F16L 33/04; F16L 55/16
(52) U.S. Cl. .............................. 24/19; 24/16 R; 138/98
(58) Field of Search ..................... 24/19, 16 R; 138/98

(56) References Cited

U.S. PATENT DOCUMENTS

| | | | |
|---|---|---|---|
| 2,550,575 A | * 4/1951 | Malcom ....................... | 24/16 R |
| 3,474,832 A | * 10/1969 | Broadhead et al. ........... | 138/98 |
| 4,589,447 A | 5/1986 | Kane et al. | |
| 4,647,251 A | 3/1987 | Gale | |
| 5,171,105 A | 12/1992 | Grotenhofer | |
| 5,299,344 A | * 4/1994 | Oetiker .......................... | 24/19 |
| 5,468,322 A | 11/1995 | Menzel | |
| 5,499,430 A | * 3/1996 | Strazar .......................... | 24/19 |
| 5,704,098 A | * 1/1998 | Calmettes ...................... | 24/19 |
| 5,909,852 A | * 6/1999 | Allert ............................. | 24/19 |
| 5,930,872 A | * 8/1999 | McBride et al. ............... | 24/19 |

FOREIGN PATENT DOCUMENTS

GB 2 154 808 A 9/1985

* cited by examiner

Primary Examiner—Victor Sakran
(74) Attorney, Agent, or Firm—Oliff & Berridge, PLC

(57) ABSTRACT

The present invention relates to a tightening fastener, in which a clip band is bent in the shape of a ring or a spiral, as well as a tension locking system, wherein the clip band can be used to fasten elongated objects such as cables or pipes in pipeworks and mainly pipes which cannot be accessed. A series of radially protruding holders may be attached to the clip band. These holders are positioned to receive cables, pipes, or other elongated objects. The tension locking system may include a stop member which can, for example, be made in the shape of a stop bolt and which may be maintained in a stop position by a stop frame. When the stop bolt is disengaged from its stop position, the tension locking system partially expands and transmits the tightening force to the clip band, thus tightening the clip band.

13 Claims, 9 Drawing Sheets

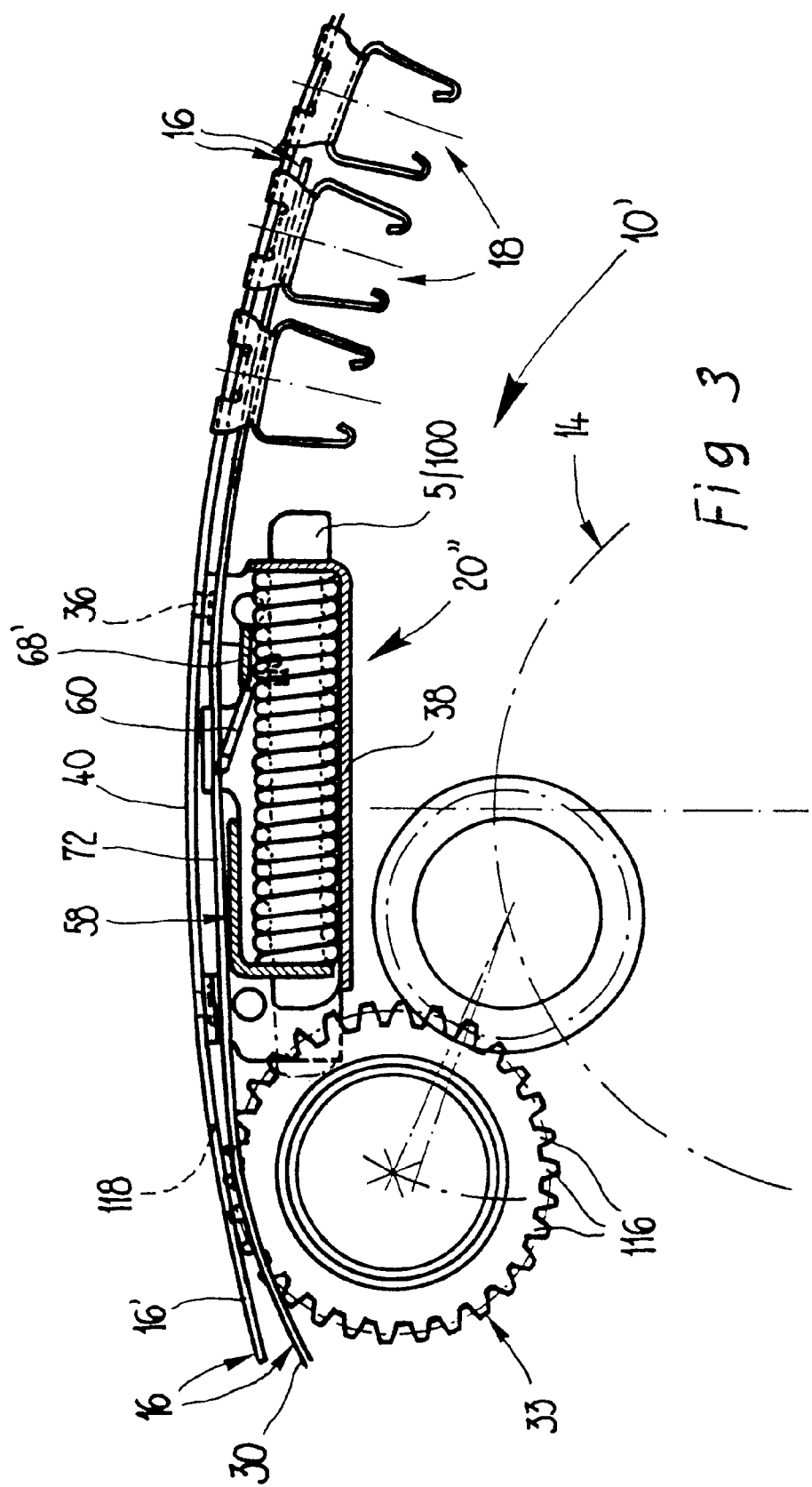

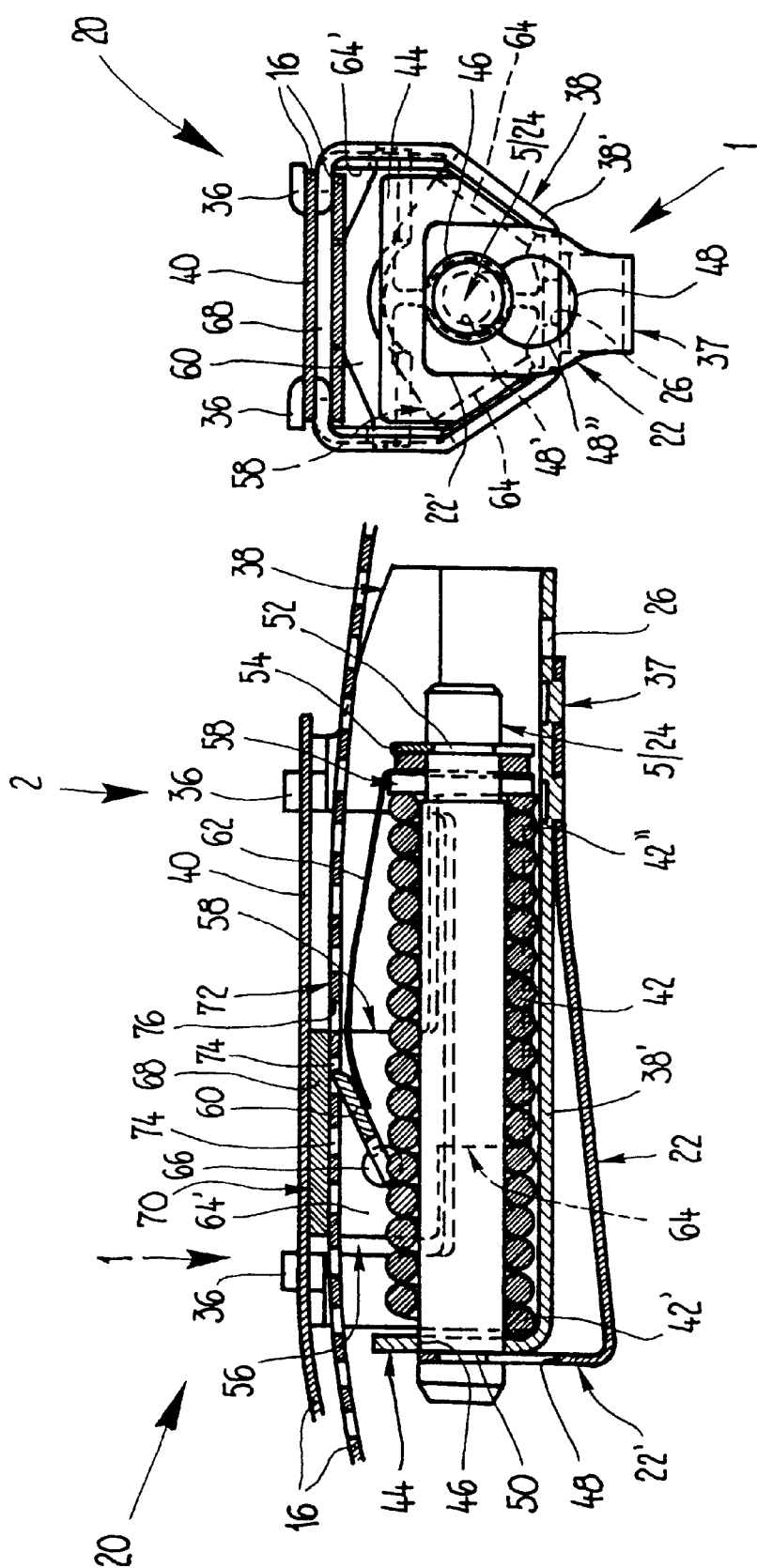

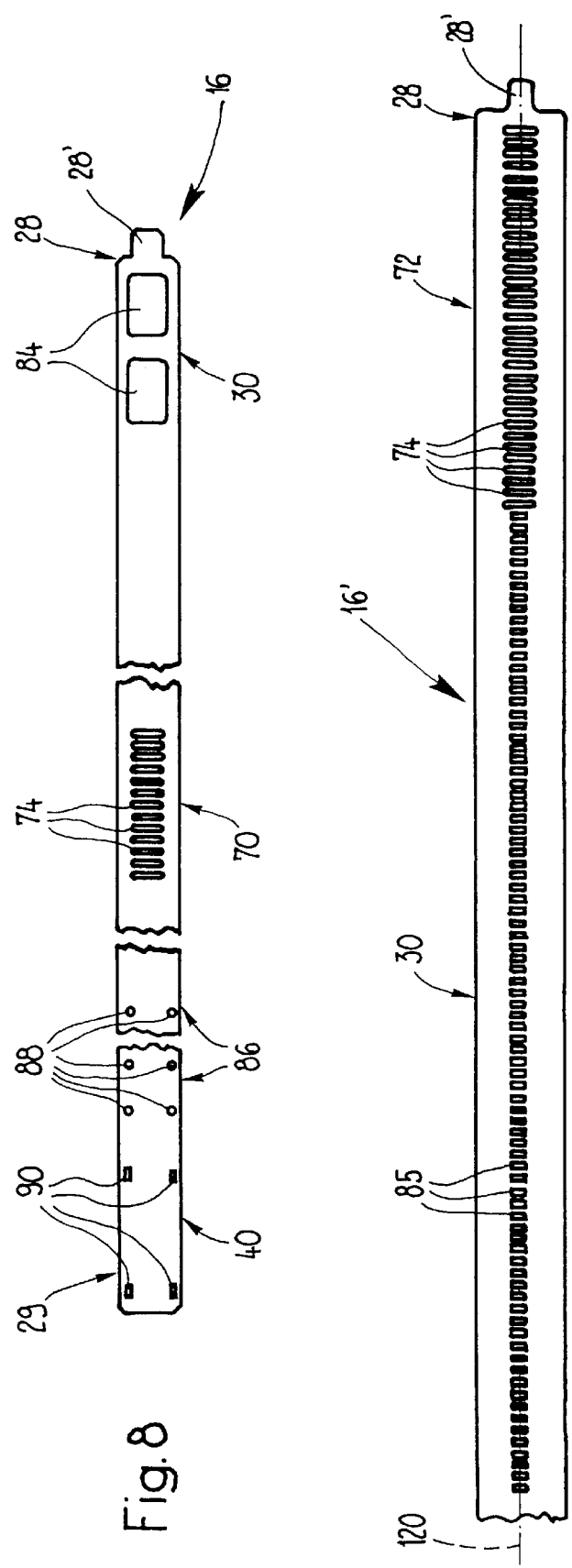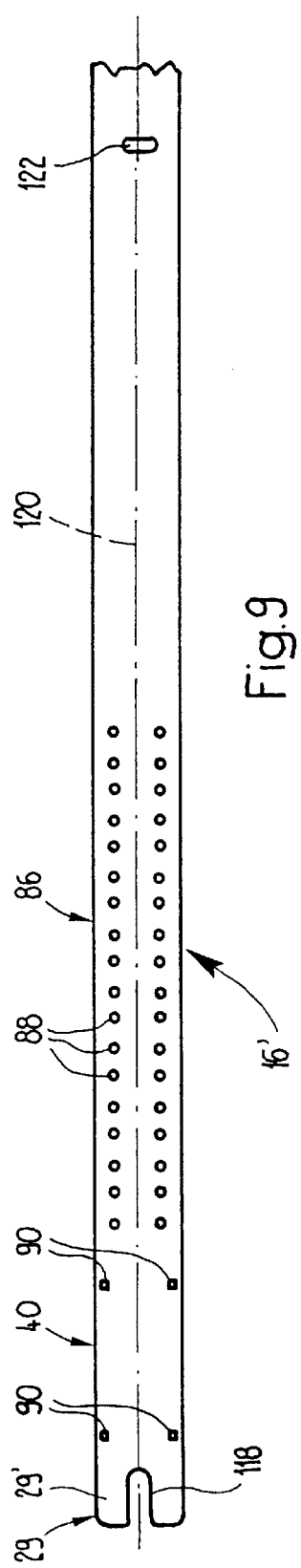
Fig. 8
Fig. 9

TIGHTENING STRIP WITH TENSION LOCKING SYSTEM

This application is the National Stage of International Application No. PCT/CH98/00331, filed Aug. 7, 1998, which claims the benefit of European Patent Application No. 98 102682.6, filed Feb. 17, 1998.

The invention relates to a clip having a tightening fastener in accordance with claim 1.

Clips are provided in various embodiments, for example as internal or as external clips, with or without special holding means for elongated objects to be tied up together or to be laid, such as cables, pipes, hoses or the like. A common feature of the clips is that the force for tightening the clips has to be placed into the system from the outside, for example by rotating screws or by moving a tightening lever. This is often a problem specifically at inaccessible locations if, in addition, relatively large forces are required for the tightening.

The object of the present invention is therefore to provide a clip which can be fitted without a problem and can be tightened in a simple manner.

This object is achieved by means of a clip having a clip band which is bent to form a ring or to form a spiral and has a fastening section to which a tightening fastener is fastened. The clip band is passed annularly back to the tightening fastener and through a freewheel arranged in or on the tightening fastener. A blocking element in the freewheel, in the form of blocking teeth or a blocking arm, interacts with a blocking section of the clip band in such a manner that the clip band can slip away counter to its tightening direction. The blocking element of the freewheel is connected to a spring provided in the tightening fastener. The spring is supported fixedly at one end with regard to the clip band, and at the other end is supported on a releasable latching element which keeps it tightened in the latching position. If the latching element is unlatched from its latching position, the spring extends and the tightening force is transmitted to the clip band via the blocking element coupled to the spring in the freewheel. The clip is therefore tightened.

The necessary energy for tightening the clip is therefore already stored in the clip, specifically in such a manner that it can easily be released and the clip is as a consequence set into the tightened state.

A clip according to the invention can be designed both as an internal or also as an external clip. Correspondingly, the clip band of an external clip is placed under tensile stress during the unlatching of the latching element and the clip band of an internal clip is placed under compressive stress. Prior to the assembly, the clip band of an internal clip is coiled up spirally and is then widened approximately to result in a ring form, while the clip band of an external clip is more annular prior to the assembly and is then constricted under tensile stress and optionally coiled up spirally.

The clip according to the invention, as described in claim 9, is particularly suitable as an internal clip, since the clip band selected for such a case with an appropriate buckling resistance can be placed under compressive stress in a very simple manner.

An internal clip of this type, in accordance with claim 13, is outstandingly suitable for the laying and holding of elongated objects, such as, for example, cables or pipes, in pipeline systems, specifically also in sewerage lines and pipes which are not accessible. In this case, not only has the simple possibility of tightening the clip proven advantageous, a further advantage for the use as an internal clip in a pipe is the adjustable radius of the clip band bent angularly or spirally.

The clip is placed into the pipe by means of the clip band which is coiled up spirally and whose radius is smaller than the internal radius of the pipe. For internal clips, the clip band is preferably made of special steel or a comparable material having appropriate buckling resistance, and specifically for sewerage pipes, having the appropriate corrosion resistance. At the location in the pipe at which cables or hoses or the like are to be fixed in the pipe by means of the clip, the clip is widened until the clip band bears against the pipe inner wall. Finally, the latching element of the tightening fastener is released and the clip band is placed under compressive stress by means of the spring force. As a result, the clip is pressed against the pipe inner wall with such a force that it is not brought out of its position even by surging media in the pipe.

An internal clip of this type used for the laying and holding of elongated objects in pipes preferably has holders, in accordance with claims 7 or 8, the holding elements of the holders protruding in particular radially inward from the clip band. Devices with which elongated objects can advantageously be placed into the holders of such an internal clip used in a pipe are described in EP patent application No. 98 102 683.4 and in PCT patent application representative reference: A 12318 WO/2.

For the assembly in pipes which are not accessible, the clips according to the invention can also be fitted in the pipe with the aid of a robot. For this purpose, the clips can be fitted with auxiliary elements in accordance with claims 10 to 13, which facilitate the assembly with the aid of the robot. For example, the clip band can have an access section having engagement openings or holes into which robot grippers or a toothed wheel of a robot can then grip in order to widen the clip, for example in a controlled manner. In EP patent application No. 98102681.8 and EP patent application representative reference: A12533 EP suitable robots for such an assembly of a clip according to the invention are described.

Further preferred embodiments are the subject matter of the other dependent claims.

The invention is explained in the following by way of an example with reference to FIGS. 1 to 10. In the figures, purely schematically:

FIG. 3 shows a cutout of a second embodiment of an internal clip which can be fitted in a pipe with the aid of a robot of different configuration to the robot illustrated in FIG. 1;

Figure 1:
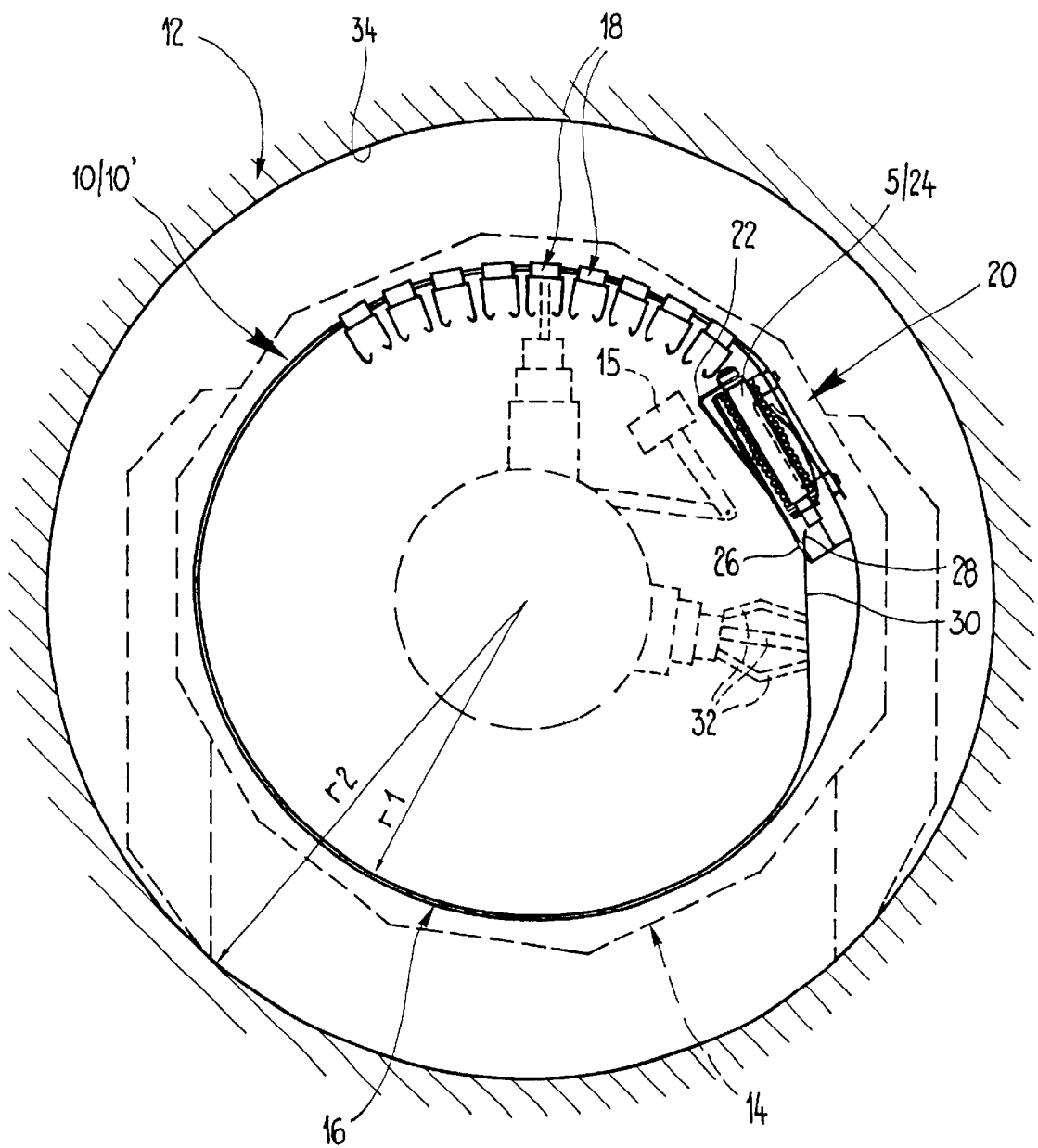
FIG. 1 shows a pipe cross section with a first embodiment of an internal clip, which can be fitted in the pipe with the aid of a robot, prior to the assembly together with a first embodiment of a tightening fastener and with a clip coiled up spirally.
Figure 2:
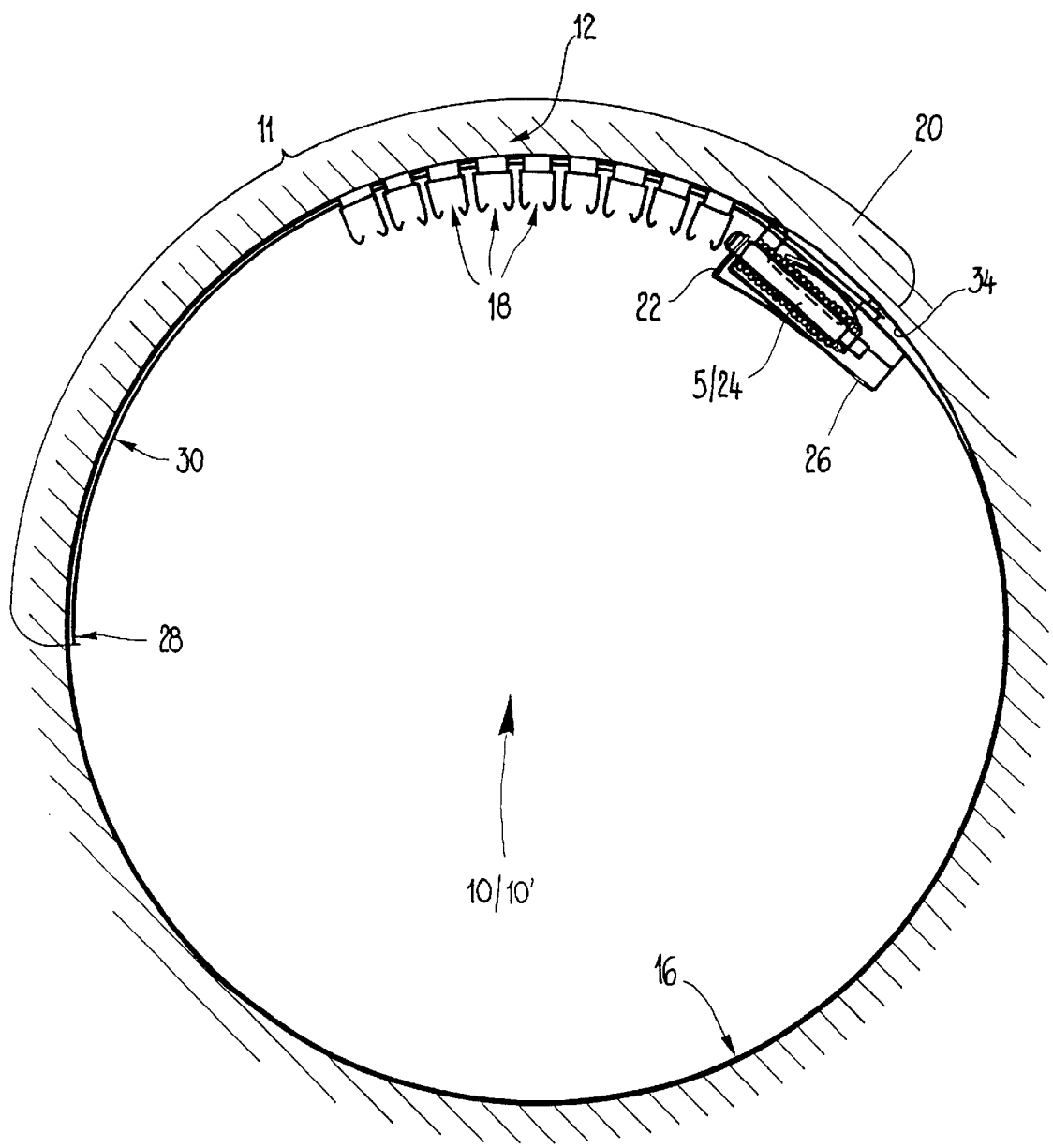
FIG. 2 shows the pipe cross section and the internal clip from FIG. 1, the clip band being widened in such a manner that it bears against the pipe inner wall.
Figures 5A, 5B:
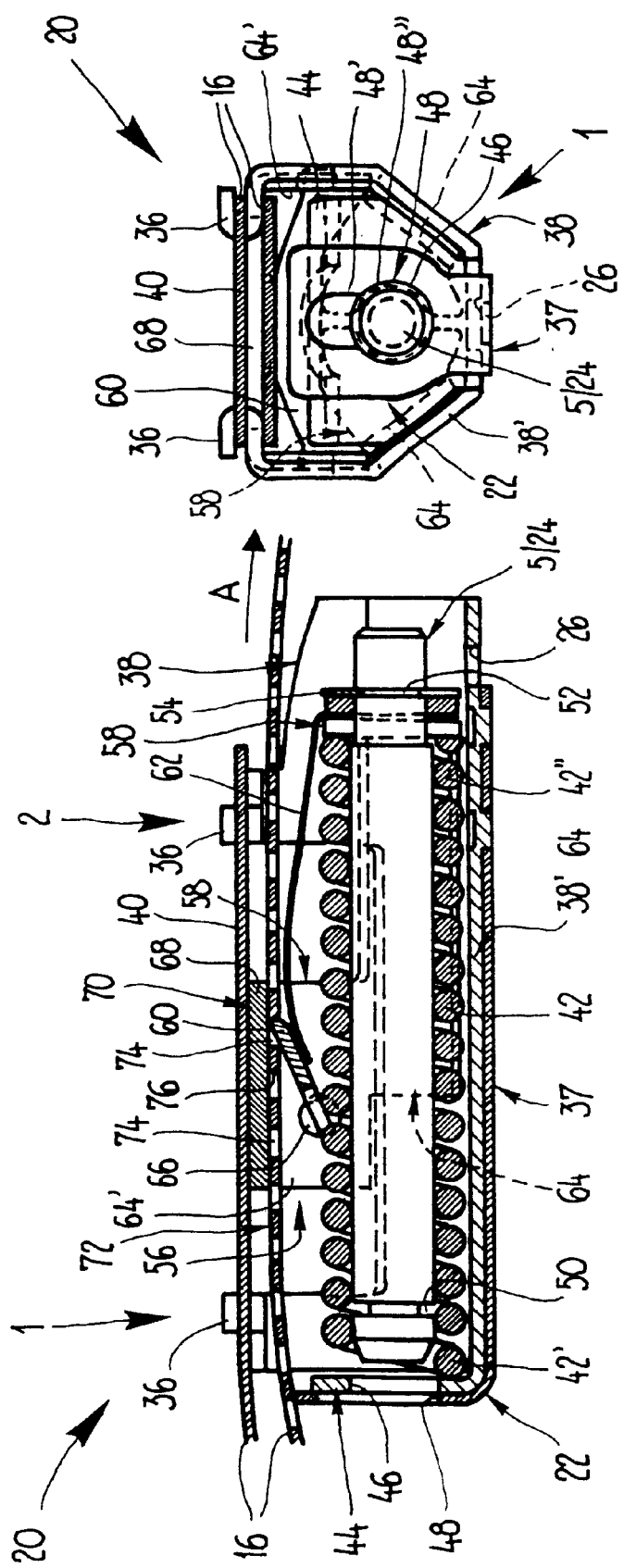
Figures 6A, 6B:
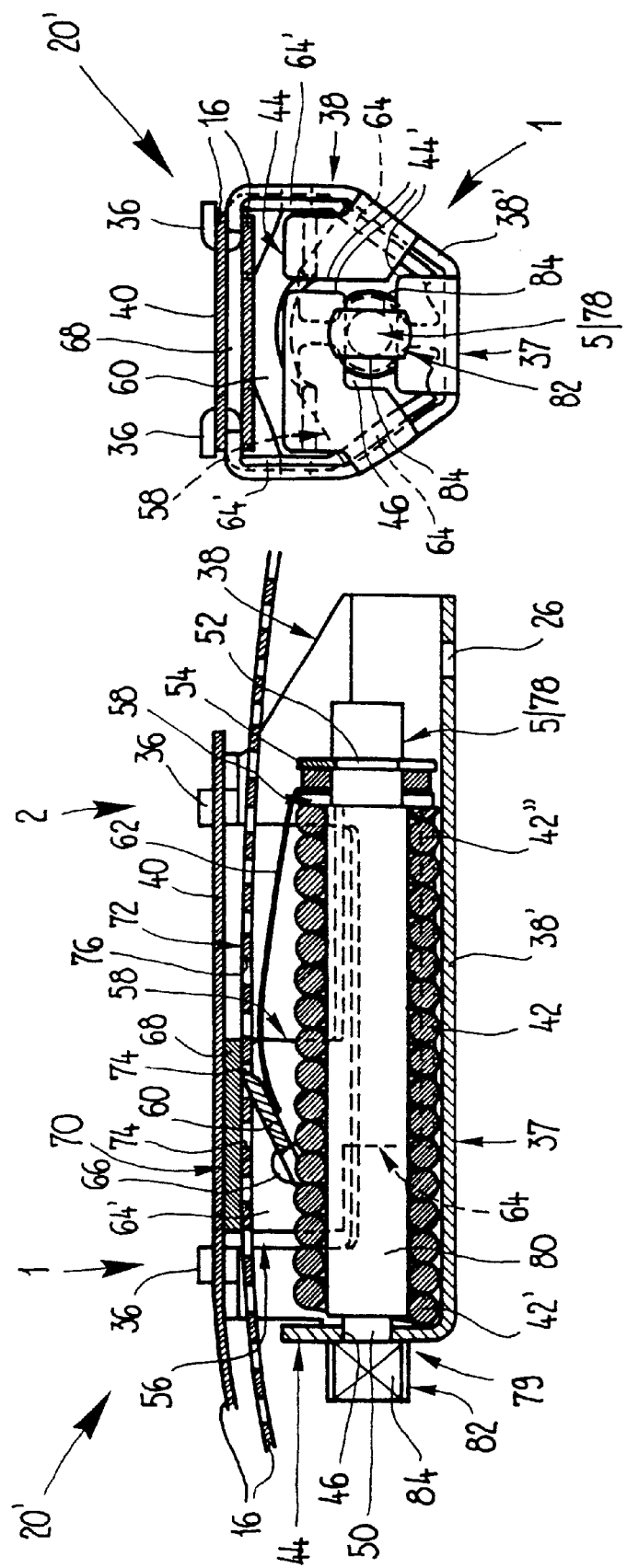
Figure 7A:
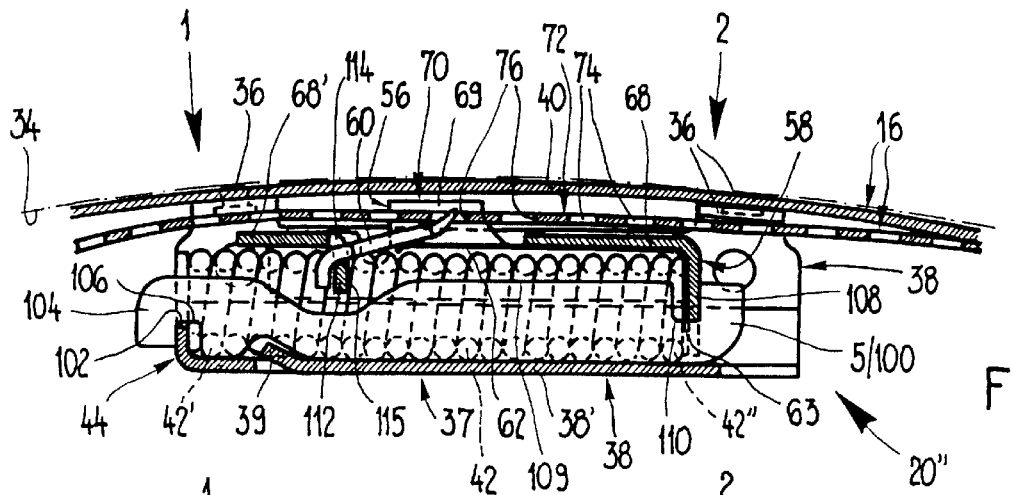
Figure 7B:
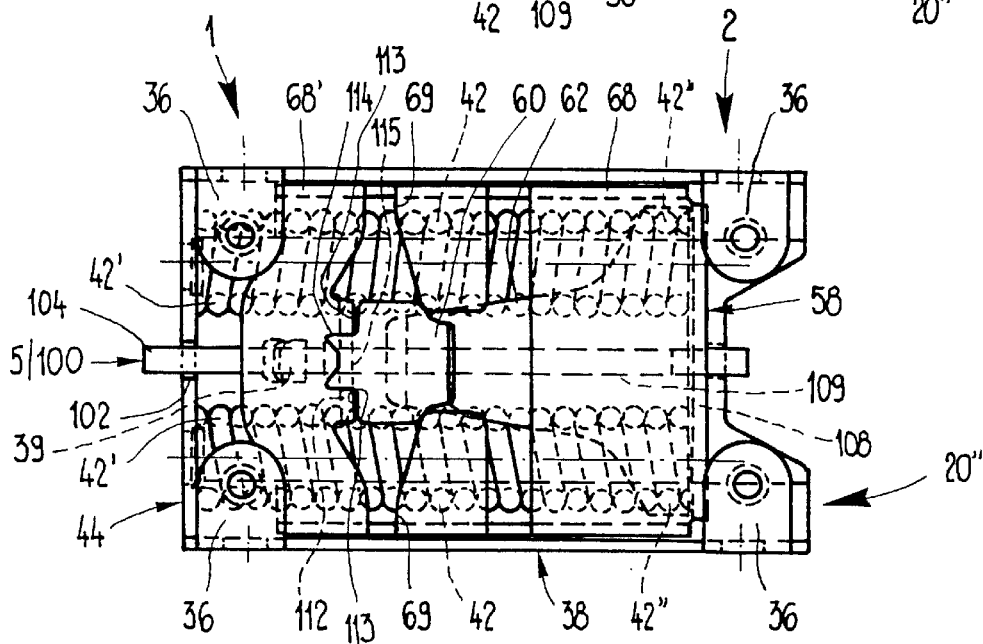
Figure 7C:
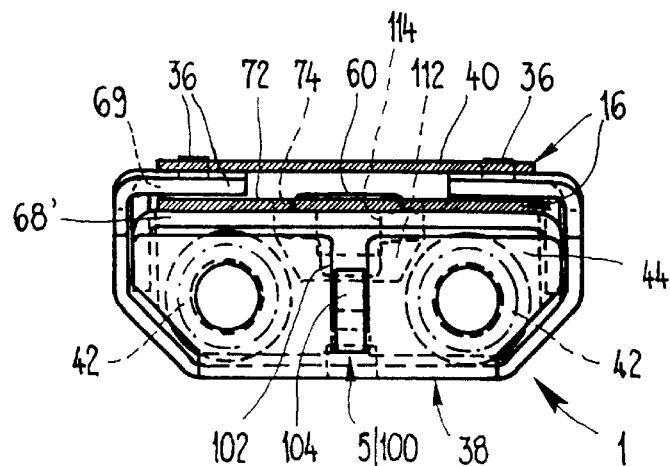
Figure 10B:
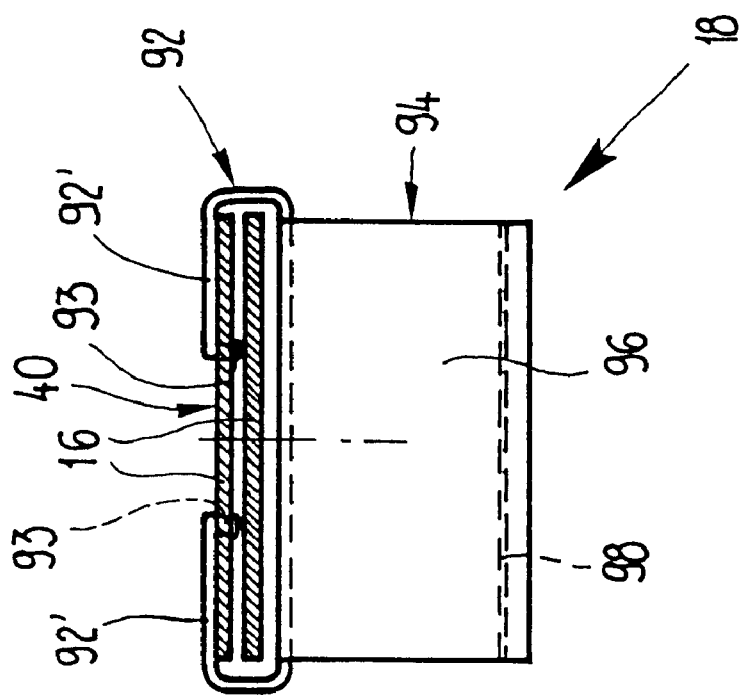
Figure 10A:
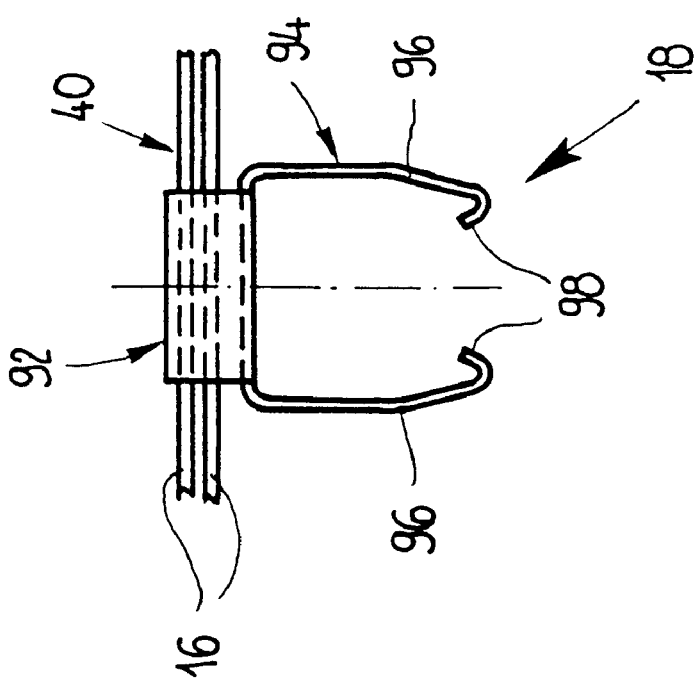

FIG. 4*a* shows a first embodiment of a tightening fastener having a latching pin and latching template, as is shown in FIGS. 1 and 2, and with a tightened spring, in a section in the longitudinal direction;

FIG. 4*b* shows the tightening fastener from FIG. 4*a* looking at the first end side which has the latching template;

FIG. 5*a* shows the tightening fastener from FIG. 4*a* in an analogous illustration with displaced latching template, unlocked latching pin and partially expanded spring;

FIG. 5*b* shows the tightening fastener from FIG. 5*a* in an analogous illustration to the illustration in FIG. 4*b*;

FIG. 6*a* shows a second embodiment of a tightening fastener with a pivot pin as the latching element and with a tightened spring, in a section in the longitudinal direction;

FIG. 6b shows the tightening fastener from FIG. 6a in an analogous illustration to the illustration in FIGS. 4b and 5b;

FIG. 7a shows a third embodiment of a tightening fastener with a latching beam as the latching element and two tightened helical springs, in a section in the longitudinal direction;

FIG. 7b shows the tightening fastener from FIG. 7a looking from the clip band;

FIG. 7c shows the tightening fastener from FIG. 7a in an analogous illustration to the illustration in FIGS. 4b, 5b and 6b;

FIG. 8 shows a first embodiment of a clip band of an internal clip fitted in a pipe with the aid of a robot;

FIG. 9 shows a second embodiment of a clip band of an internal clip fitted in a pipe with the aid of a robot;

FIG. 10a shows a holder which can be fastened to the clip band for receiving elongated objects looking transversely to the clip band;

FIG. 10b shows the holder from FIG. 10a looking in the direction of the clip band.

FIG. 1 shows, as an example for a clip 10 according to the invention, an internal clip 10' which can be fitted in a pipe 12 with the aid of a robot 14. The robot 14 is only indicated by dashed lines in FIG. 1. The internal clip 10' is shown in its state prior to assembly in the pipe 12 and has a clip band 16 which is coiled up spirally and whose radius $r_1$ is smaller than the internal radius $r_2$ of the pipe 12. For the receiving of elongated objects, such as, for example, pipes or cables, a plurality of holders 18 are fastened one behind another on the clip band 16 and point radially inward. In the example shown in FIG. 1, the tightening fastener 20 shown, in the tightened state, is a tightening fastener 20 having a latching pin 24, locked by a latching template 22, as the latching element 5. The tightening fastener 20 has an introductory opening 26 for introducing an inner band end 28 of the clip band 16, which is bent spirally. Arranged adjacent to this end 28 is an access section 30 of the clip band, which section is spaced apart from the radially outer, adjacent coil of the clip band 16 by the introduction of the band end 28 into the introductory opening 26 in the tightening fastener 20. In this manner, the access section 30 can easily be grasped by robot grippers 32 (indicated by dashed lines) and the clip 10, 10' can be widened to the radius $r_2$ of the pipe 12.

In FIG. 2, the internal clip 10' which is illustrated in FIG. 1 is illustrated in a widened state with the tightening fastener 20 still tightened. The clip band 16, which was formerly coiled up spirally, is just doubled over in a section along the pipe 12 and now bears tightly against the pipe inner wall 34 of the pipe 12 more forming a ring shape than a spiral. The inner band end 28 of the clip band 16 is no longer situated in the introductory opening 26 in the tightening fastener 20, and the access section 30 of the clip band 16, which section is adjacent to this end and is released by the robot grippers, is, because of the spring force of the clip band manufactured, for example, of special steel, no longer spaced apart from the adjacent coil of the clip band 16. In this state, the clip 10, 10' can be braced in the pipe by releasing the latching templates 22, for example by means of a hammer 15 of the robot 14, which hammer is illustrated by dashed lines in FIG. 1.

FIG. 3 shows a further embodiment of the internal clip 10' with a further embodiment of the tightening fastener 20". Instead of being widened by a robot gripper 32, this internal clip 10' is widened with the aid of a toothed wheel 33 attached to the robot 14. The access section 30 of the clip band 16' bears against the radially outer, adjacent coil of the clip band 16', which keeps the access section 30 spaced apart from the pipe inner wall. A recess 118 (see also FIG. 9) in that coil of the clip band 16' which is adjacent to the access section 30 prevents contact with the toothed wheel 33 of the robot 14. That spacing between the pipe inner wall 34 and the access section 30 which is provided by the adjacent coil of the clip band prevents the toothed wheel 33 from coming into contact with the pipe inner wall when meshing with the access section 30. Since, for the widening of the clip 10, 10' with the aid of the toothed wheel 33, the access section 30 does not have to be kept spaced apart from the adjacent coil of the clip band, the introductory opening 26 for the inner band end 28 of the clip band 16' is no longer necessary in the tightening fastener 20" shown. Details of the other characteristic features of this internal clip 10', and specifically of the clip band 16 and of the tightening fastener 20", are gone into further below.

FIGS. 4a and 4b show the tightened tightening fastener 20, which is illustrated in FIGS. 1 and 2, together with the latching template 22 and latching pin 24 in more detail. The tightening fastener 20 is fastened via fastening elements 36 of its elongated housing 38 to the fastening section 40 of the clip band 16 and has a first end section 1 and a second end section 2. A spring of the tightening fastener 20, which spring is designed as a helical spring 42 and acts as a compression spring and through which the latching pin 24 is guided, is surrounded on the longitudinal sides by the housing 38 in the form of a trough. The first end 42' of the spring 42 is supported in the first end region 1 of the tightening fastener 20 on an end wall 44 of the housing 38 which has a passage opening 46 for the latching pin 24. In the second end region of the tightening fastener 20 the housing 38 is open. In this second end region 2 of the tightening fastener 20, the introductory opening 26 is arranged on the longitudinal side opposite the clip band 16.

The latching template 22 of the tightening fastener 20 is likewise fastened to that longitudinal side 37 of the housing 38 which is opposite the clip band 16, and is formed, for example, from a metal sheet made of spring steel. The latching template 22 is designed in such a manner that a part 22' of the latching template 22, which part has a keyhole-shaped template opening 48 with a narrower opening part 48' and a further opening part 48", is arranged outside the housing 38 in front of the end wall 44 and can be displaced there in the direction of the clip band 16. That part of the latching pin 24 which is directed counter to the first end region 1 of the tightening fastener 20 has a first annular groove 50 of reduced diameter compared to the latching pin 24. In the tightened state of the tightening fastener 20, which is shown in FIGS. 4a and 4b, the latching pin 24 is passed through the passage opening 46 in the end wall 44 and through the template opening 48 in the latching template 22, and the boundary of the narrower opening part 48' of the template opening 48 engages in the first groove 50 of the latching pin 24, as a result of which when the spring 42 is tightened, the latching pin 24 is locked and held in its latching position.

A dual locking plate 54 is fixed on that side of the latching pin 24 which is opposite the end wall 44, in a second groove 52 of the latching pin 24, a second end 42" of the helical spring 42 being supported with regard to the latching pin 24 via the said locking plate 54. The locking plate 54 also serves to fix further elements placed onto the latching pin 24 between it and the helical spring 42, such as, for example, to fix a slide 58 carrying a freewheel 56 and a leaf spring 62 supporting a blocking element 60 of the freewheel 56.

The slide 58 fixed on the latching pin 24 has two side walls 64 which extend on the outside of the helical spring 42 from the second end region 2 of the tightening fastener 20 toward the first end region 1 of the tightening fastener 20, and toward the first end region 1 protrude toward the clip band 16 over the helical spring 42. Those parts 64' of the side walls 64 which protrude over the helical spring 42 have bearing openings 66 in which the blocking element 60 of the freewheel 56, which blocking element is designed as a blocking arm, is rotatably mounted. Those two parts 64' of the side walls 64 which protrude over the spring 42 are connected to each other by means of a connecting plate 68 which spans the helical spring transversely to its longitudinal direction. The connecting plate 68, together with the parts 64' of the side walls 64 of the slide 58, forms a guide element 70 of the freewheel 56. The freely-running part of the clip band 16 is guided through this guide element 70 of the freewheel 56 and is held by the same in the region of the tightening fastener 20 at a minimum spacing with respect to the fastening section 40 of the clip band 16. The leaf spring 62, which is likewise fastened to the latching pin 24, extends, spanning the spring 42 in the longitudinal direction, from that side of the latching pin 24 which is opposite the end wall 44 and so under the connecting plate 68 of the freewheel 56. It supports the rotatably mounted blocking element 60 of the freewheel 56 and presses said element resiliently against the clip band 16, which runs through between the blocking element 60 and connecting plate 68.

That band section of the clip band 16 which is situated in the freewheel 56 and is illustrated in FIGS. 4*a* and 4*b* is a blocking section 72 which has, because of blocking holes 74, blocking flanks 76 into which the blocking element 60 of the freewheel 56 can latch.

In FIGS. 5*a* and 5*b*, the tightening fastener 20 from FIGS. 4*a* and 4*b* is illustrated in a partially expanded state. The latching template 22 is displaced in the direction of the clip band 16, so that the further opening part 48" of the template opening 48 is displaced to the height of the passage opening 46 in the side wall 44, as a result of which the latching pin 24 is unlocked and, because of the spring stress, is slid into the interior of the housing 38. The elements fixed on the latching pin 24, like the slide 58 which carries the freewheel 56 and to which the blocking element 60 is also fastened, and the leaf spring 62 supporting the blocking element 60 are displaced with the bolt 24 toward the second end region 2 of the tightening fastener 20. The blocking element 60 engages in a blocking hole 74 in the blocking section 72 of the clip band 16 and transmits that force of the helical spring 42 which is passed on via the slide 58 to the blocking element 60 to the clip band 16 which is placed under compressive stress (arrow direction A) by the appropriate spring force.

By means of the tightening fastener 20 which is illustrated in FIGS. 1 and 2 and also 4*a* to 5*b*, the clip band 16, which already bears against the pipe inner wall 34 before the latching pin 24 is unlocked, as shown in FIG. 2, is therefore firmly pressed against the pipe inner wall 34—by means of the spring force which can be determined prior to the use of the clip 10, 10'—and the clip 10, 10' is fixedly secured in the pipe 12.

In FIGS. 6*a* and 6*b*, a tightening fastener 20' is shown which in principle is of identical construction to the tightening fastener 20 which is illustrated in FIGS. 1 and 2 and 4*a* to 5*b*. The tightening fastener 20' only differs from the tightening fastener 20 by the fact that instead of the latching pin 24 interacting with the latching template 22 it has a pivot pin 78 as the latching element 5. In the end section 79 facing the end wall 44 the pivot pin 78 is again provided with a first groove 50 which lies between the pin body 80 and pin head 82 and separates the two. The pin head 82 has milled-off portions 84 on two opposite sides, with the result that it approximately assumes a beam shape. The milled-off portions 84 are dimensioned in such a manner that the pin head 82 only passes through the passage opening 46 in the end wall 44 in a defined position of the pivot pin 78. In the example shown, the end wall 44 is formed of three wall elements 44' (FIG. 5*b*) which bound a rectangular passage opening 46 through which the pin head 82 passes in the horizontal direction. If the pin head 82 is pushed out of the housing 38 through the passage opening 46 and rotated into a vertical position, parts of the wall elements 44' of the end wall 44 grip into the groove 50 behind the pin head 82 and prevent the pivot pin 78 from sliding back with the pin head 82 into the housing 38 through the passage opening 46 in the end wall 44.

In that position of the pivot pin which is shown in FIGS. 6*a* and 6*b* with the pin head 82 standing vertically and situated outside the housing 38, the helical spring 42 which is pushed onto the pivot pin 78, and therefore the tightening fastener 20 is tightened. If the pivot pin 78 is rotated through 90°, the pin head 82 slides through the passage opening 46 in the end wall 44, the spring 42 is extended and transmits, via the slide 58 and the blocking element 60, its spring force to that blocking section 72 of the clip band 16 which is situated in the freewheel 56 and therefore to the entire clip band 16 of the clip 10, 10'. The clip 10, 10' is tightened.

The further embodiment of the tightening fastener 20" which is shown in FIG. 3 is illustrated in more detail in FIGS. 7*a* to 7*c*. The tightening fastener 20" is in principle of identical construction to the tightening fastener 20', which is illustrated in FIGS. 6*a* to 6*b*. However, the elongated housing 38 of the tightening fastener 20" is connected via the fastening elements 36 to the fastening section 40 of the clip band 16 by rivets instead of via screws or pins. This has the advantage that with the clip 10, 10' widened, the clip band bears more tightly in the fastening section 40 against the pipe inner wall 34.

Instead of the pivot pin 78 surrounded by a helical spring 42 in the tightening fastener 20', in the tightening fastener 20" a latching beam 100 is provided which is flanked by two helical springs 42. Instead of the passage opening 46, the end wall 44 of the housing 38 has a latching incision 102 through which a lug 104 of the latching beam 100 is passed in order to tighten the tightening fastener 20". For more simple passing through of the lug 104 through the latching incision 102 during assembly, on that side 37 of the housing 38 which is opposite the clip band 16 a small part of the housing wall 38' is bent upward toward the latching beam 100 as a passage aid 39. The lug 104 is separated from the body 108 of the latching beam 100 by a notch 106. In the tightened state of the tightening fastener 20", the notch 106 and the latching incision 102 of the end wall 44 grip into each other in such a manner that the latching beam 100, standing perpendicularly with respect to the end wall 44, grips with its lug 104 behind the end wall 44 and is thereby locked. The locking can be released by, for example, the hammer 15 of the robot 14, as is illustrated in FIG. 1, striking against the lug 104 of the latching beam and displacing the lug 104 in the direction of the clip band 16. Because of the spring stress the lug 104 slides through the latching incision 102 into the housing 38.

As in the tightening fasteners 20 and 20', here too the helical springs 42 are supported at their first spring end 42' against the end wall 44 of the housing 38. However, instead of being supported against a locking plate 54, the opposite, second spring end 42" is supported against a front wall 108 of the slide 58. The slide 58 in turn has side walls 64 which extend between the helical springs 42 and the housing 38 from the second end region 2 to the first end region 1 of the tightening fastener 20". Via the front wall 108, which is secured in a securing groove 110 of the latching beam 100 in the second end region 2 of the tightening fastener 20", the slide 58 is coupled to the latching beam 100 and is moved together with the latter, when the locking of the latching beam 100 is released, by means of the helical spring 42 in the direction of the second end region 2 of the tightening fastener 20". The side wall 64 of the slide 58 protrude over the helical springs 42 on that side which faces the clip band 16 and are connected to one another in the two end regions 1, 2 by connecting plates 68, 68'. The connecting plates 68,68' form, together with guide plates 69 which are arranged between them and fit over the helical springs 42 laterally from the side walls 64, the guide element 70 of the freewheel 56. The guide plates 69 are spaced apart from the helical springs 42 in such a manner that the clip band 16 can be passed approximately linearly over the connecting plates 68, 68' and under the guide plates 69 in a free-running manner.

The connecting plate 68' in the first end region 1 of the tightening fastener 20" has, on its side facing the guide plates 69 and between the helical springs 42, a flange 112 which is oriented into the housing interior and has a centrally arranged opening 114. The blocking element 60, which in turn is designed in the form of a blocking arm, grips through the opening 114 and is secured against pulling behind the flange 112. The blocking element 60 is secured against pushing via impact flanks 113 which bear against the front side 115 of the flange. The blocking element 60 protrudes in the direction of the second end region 2 of the tightening fastener 20" over the helical springs 42 and the connecting plates 68, 68' toward the clip band 16. The blocking element 60 is in turn gripped from below by a leaf spring 62 which presses the blocking element 60 resiliently against the free-running part of the clip band 16. The leaf spring 62 is arranged approximately parallel to the helical springs 42 and in the region of the connecting plate 68 between the connecting plate 68 and helical springs 42. In the second end region 2 of the tightening fastener 20", the leaf spring has a vertically bent section 63 via which it is pressed by means of the helical springs 42 against the front wall 108 of the slide 58 and is secured there.

Apart from the tightening fastener 20, 20', 20" which, as shown, can be designed such that it differs in its details, the clip band can also be configured such that it differs, the functional design of the robot 14 also playing a role.

FIG. 8 shows a clip band 16 as is used, for example together with a robot 14, illustrated in FIG. 1, having robot grippers 32 to widen the clip 10, 10'. The band end 28 of the clip band 16 is shaped as an introductory tab 28' which is intended for introducing into the introductory opening 26 in the tightening fastener 20, 20'. The access section 30 is arranged adjacent to the introductory tab 28', said access section in this exemplary embodiment having engagement openings 84 to give access to robot grippers 34. The blocking section 72 of the clip band 16, whose position in the clip band 16 is selected in accordance with the internal circumference of the pipe 12, is provided with blocking holes 74 into which the blocking element 60 can latch in the freewheel 56 of the tightening fastener 20. The holders 18, which are illustrated in FIGS. 1 and 2, are fastened to a holder section 86 of the clip band 16. The holder section 86 can have, for this purpose, fastening means, for example in the form of the fastening holes 88 which are shown here.

Arranged at that end 29 of the clip band 16 which is opposite the band end 28 is the fastening section 40 of the clip band 16 to which the tightening fastener 20, 20', 20" can be fastened. For a more simple fastening of the tightening fastener 20, 20', 20", fastening openings 90 are also provided in the fastening section 40, through which openings, for example, the fastening elements 36 of the tightening fasteners 20, 20' can grip, as is illustrated in FIGS. 4a to 6b. However, screws, pins or other fastening means can also be pushed through.

In FIG. 9, a second embodiment of a clip band 16' is shown which can be used, for example, if the robot 14 has, instead of the robot gripper 32, a toothed wheel 33 having teeth 116 for widening the clip 10, 10', as is illustrated in FIG. 3. The clip band 16' is in principle of identical construction to the clip band 16 from FIG. 8. However, instead of the engagement openings 84, in the access section 30 of the clip band 16' holes 85 are provided with which the teeth 116 of the toothed wheel 33 can mesh. If the toothed wheel 33 of the robot 14, as seen in the widening direction, is arranged upstream of the tightening fastener 20, 20', 20", as is illustrated in FIG. 3, instead of the access section 30, the blocking section 72 is arranged adjacent to the band end 28. So that the blocking element 60 can only engage in a blocking manner in the blocking section 72 of the clip band 16, the blocking element 60 and the teeth 116 of the toothed wheel 33, and correspondingly also the blocking openings 74 and the holes 85, are each configured such that they differ from one another. In the clip band 16' shown here, for example, the extent of the blocking openings 74 transversely to the longitudinal direction of the clip band 16 is greater than that of the holes 85, it being possible, in the case shown here, for the teeth 116 of the toothed wheel 33 also to mesh with the blocking opening 74 in the blocking section 72 of the clip band 16'. In order to protect the section 29' at the end 29 of the clip band 16 from being gripped by the teeth 116, an incision 118 is provided in the width of the teeth 116 and along the longitudinal central axis 120 of the clip band 16 from the end 29 of the clip band 16 as far as the fastening section 40. In order to ensure orderly transport of the constricted clip 10, 10' without the spiral coiling up of the clip band 16 being released, and to ensure easy access of the toothed wheel 33 of the robot 14 in order to widen the clip 10, 10' during the assembly, an opening 112 is provided in the clip band 16', into which opening the introductory tab 28' is introduced at the band end 28.

In FIGS. 10a and 10b an embodiment of the holder 18 is illustrated by way of example, which holder is fastened to the clip band 16 in order to receive cables, pipes or similar elongated objects, as is shown in FIGS. 1 to 3. The holder 18 has a fastening member 92 which is of C-shaped design in the exemplary embodiment shown, both flanks 92' of the C-shaped fastening member 92 which point towards one another lying opposite a holding element 94 for receiving the elongated objects. The flanks 92' have tabs 93 which protrude approximately vertically into the C-shape of the fastening member 92, engage into the fastening holes 88 in the holder section 86 of the clip band 16, 16', for example with a frictional connection, and are preferably formed by bending over relatively small sections of the flanks. The C-shape of the fastening member 92 is configured in such a manner that the holding element 94 is spaced apart from the holder section 86 of the clip band 16, 16', and a further section of the clip band 16 can be passed through with a clearance between the holding element 94 and the holder section 86 of the clip band 16, 16'. The holding element 94 is configured in the form of two holding tongues 96 whose end sections 98 are bent around toward one another in the form of a hook. The holding tongues 96 are of resilient design and grasp the objects to be held in the manner of a clip.

In addition to the embodiments shown and described in the figures, other embodiments of the clip 10, 10' according to the invention are also conceivable.

The clip 10, 10', as already said, can therefore also be configured as an external clip, and it can, for example, also be used without holders 18. As the latching element 5, instead of a latching pin 24, a pivot pin 78 or a latching beam 100, it is possible, for example also for a latching clamp, a latching lever or the like to be provided. Also, the blocking element 60 in the freewheel 56 does not have to be a blocking arm, but can equally well have the form of a spike or be configured in the form of a plurality of blocking teeth. Also the position of the freewheel 56 with regard to the spring 42 and the housing 38 of the tightening fastener 20 does not have to be in the form shown. The spring force of the spring 42 only has to be transmitted to the clip band 16, 16' via the freewheel when the latching element 5 is unlatched.

The holders 18 can also be of a different configuration, for example as eyelets through which the elongated objects can be threaded. The holders 18 and the tightening fastener 20 can be fastened to the clip band 16, 16' with bolts, screws, rivets, plug-in connections or even by welding or soldering. Also the design of the blocking flanks 76 in the blocking section 72 of the clip band 16, 16' can take place in a different manner than just via blocking holes 74, for example via incorporated steps or depressions. Instead of the engagement openings 84 and holes 85 in the access section 30 of the clip band 16, for example hooks or the like are also conceivable.

What is claimed is:

1. A clip having a clip band (16) to which, on a fastening section (40), a tightening fastener (20, 20', 20") provided with a spring (42) is fastened, and whose blocking section (72) is intended for interaction with a freewheel (56) of the tightening fastener (20, 20', 20"), a first end (42') of the spring (42) being fixedly supported with regard to the fastening section (40), and the tightening fastener (20, 20', 20") having a releasable latching element (5) which is intended, in the latching position, to hold the spring (42) in a tightened state, a second end (42") of the spring (42), which end interacts with the latching element (5), interacting with the freewheel (56) in such manner that when the latching element (5) is unlatched the clip band (16) in secured in the freewheel (56) and the clip band (16) is placed under tension by means of the unblocked spring (42), wherein the clip band is shaped as a ring or spiral.

2. The clip as claimed in claim 1, wherein the latching element (5) is a pivot pin (78) which is configured in such a manner that it is made to unlatch by rotation, preferably through 90°.

3. The clip as claimed in claim 1, wherein the latching element (5) is a latching pin (24) which can be held in its latching position by means of a latching template (22), and the template (22) is configured in such a manner that displacement of the template (22) results in the latching pin (24) unlatching.

4. The clip as claimed in claim 1, wherein the latching element (5) is a latching beam (100) which can be held in the latching position by means of a lug (104) arranged on it, displacement of the lug (104) resulting in the latching beam (100) unlatching.

5. The clip as claimed in claim 1, wherein the blocking section (72) is provided with locking flanks (76) against which a blocking element (60) of the freewheel (56), preferably in the form of a blocking arm, can act in order to block the clip band (16).

6. The clip as claimed in claim 1, wherein the tightening fastener (20, 20', 20") has a housing (38) via whose fastening elements (36) the tightening fastener (20, 20', 20") is fastened to the fastening section (40) of the clip band (16) and against whose one end wall (44) the first end (42') of the spring (42) is fixedly supported, the second end (42") of the spring (42) interacting with a slide (58) carrying the freewheel (56).

7. The clip as claimed in claim 1, wherein it has a holder (18) fastened to the clip band (16) via a fastening member (92) and having a holding element (94) for receiving elongated objects, in particular cables or pipes, the fastening member (92) keeping the holding element (94) spaced apart from the clip band (16), which is connected to the fastening member, in such a manner that a further section of the clip band (16) can be passed through between the holding element (94) and the clip band (16), which is connected fixedly to the holder (18).

8. The clip as claimed in claim 7, wherein the holding element (94) of the holder (18) is configured in the manner of a clip with two resilient holding tongues (96), and wherein preferably a multiplicity of holders (18) are arranged one behind another at a fixed spacing on the clip band (16).

9. The clip as claimed in claim 1, wherein it is an internal clip (10') and wherein the clip band (16) is placed under compressive tension by unlocking of the tightening fastener (20, 20', 20"), the buckling resistance of the clip band (16) being selected in such a manner that it does not buckle under the compressive tension applied.

10. The clip as claimed in claim 9, wherein it can be held on a section of the clip band (16) by a robot (14), and wherein the clip band (16) has an access section (30) which can be grasped by a robot (14) in order to widen the clip band (16), with the result that the clip (10/10') can be fitted in a pipe (12) with the aid of the robot (14).

11. The clip as claimed in claim 10, wherein the access section (30) is adjacent to an inner end (28) of the clip band (16), which is coiled up spirally, and has engagement openings (84) giving access to robot grippers (32), and wherein the band end (28), which is configured in the form of an introductory tab (28'), is introduced prior to the assembly into an introductory opening (26), provided for this purpose, in the tightening fastener (20, 20', 20"), as a result of which the access section (30) is kept spaced apart from the adjacent coil of the clip band (16).

12. The clip as claimed in claim 10, wherein the access section (30) has holes (85) giving access to a toothed wheel (33) arranged on the robot and an inner end (28) of the clip band (16) which is coiled up spirally and is preferably configured in the form of an introductory tab (28' ), is introduced prior to the assembly in particular into an opening (122), provided for this purpose, in the clip band (16).

13. The use of a clip as claim 9, for holding elongated objects, preferably cables and pipes, in pipeline networks and, in particular, in pipes (12) which are not accessible.

* * * * *